United States Patent [19]

Cutter

[11] Patent Number: 4,538,293
[45] Date of Patent: Aug. 27, 1985

[54] X-RAY FILM CASSETTE HOLDER

[76] Inventor: James W. Cutter, 85 Franks Dr., Hollister, Calif. 95023

[21] Appl. No.: 468,985

[22] Filed: Feb. 23, 1983

[51] Int. Cl.³ .............................................. H05G 1/00
[52] U.S. Cl. ..................................... 378/181; 378/182
[58] Field of Search .......................... 378/181, 182, 167

[56] References Cited

U.S. PATENT DOCUMENTS

| 3,826,922 | 7/1974 | Ingles .................................... | 378/181 |
| 3,976,887 | 8/1976 | Holzermer et al. ................... | 378/181 |
| 4,416,020 | 11/1983 | Wagner et al. ...................... | 378/181 |
| 4,426,724 | 1/1984 | Cutter .................................. | 378/181 |
| 4,455,672 | 6/1984 | Hahn et al. .......................... | 378/181 |

FOREIGN PATENT DOCUMENTS

1131450  2/1957  France ................................ 378/181

Primary Examiner—Alfred E. Smith
Assistant Examiner—Carolyn E. Fields
Attorney, Agent, or Firm—Claude A. S. Hamrick

[57] ABSTRACT

An X-ray film cassette holder 10 including a clamping mechanism for centering a film cassette C therein as the holder is inserted into an associated X-ray machine, and also including a position measuring device 184 for sensing the dimensions of the film cassette. The clamping mechanism has two positioning assemblies 34 and 36 that act to position the film cassette C in two orthogonal directions and an actuator mechanism 148 that links the positioning operation to the insertion movement, all mounted on a tray 12 that is adapted for insertion into the X-ray machine. The two positioning assemblies 34 and 36 include parallel clamps 44 and 46 and 52 and 54 attached to slides 102 and 106 and 122 and 136 of double slider-crank mechanism 86 and 88 so that the clamps move in opposite directions as the crank 92 and 110 rotate about a pivot 90 in the center of the tray 12. One of the cranks 92 is spring biased, while the other crank 110 is releasably coupled to the actuator mechanism 148 by a pawl 168 to limit insertion and withdrawal forces.

6 Claims, 14 Drawing Figures

FIG_ 4

X-RAY FILM CASSETTE HOLDER

BACKGROUND OF THE INVENTION

1. Field of the Invention

This invention relates generally to X-ray apparatus, and more specifically to improved apparatus for positioning and centering an X-ray film cassette within an X-ray machine.

2. Description of the Prior Art

Film or other sensitive material to be exposed to X-rays for medical diagnostic and other purposes is commonly packaged in cassettes of varying sizes to suit particular purposes. It is desirable to limit the size of the X-ray beam according to the size of the film cassette. By so limiting the size of the X-ray beam, patient exposure to X-rays is minimized. fIt is also desirable to position the film cassette in the center of the X-ray beam so as to facilitate the design and implementation of apparatus for adjusting the size of the X-ray beam. Additionally, it is desirable to automatically communicate the size of the film cassette to the X-ray beam adjusting apparatus to permit automatic adjustment.

Although adjustment of the X-ray beam can be performed manually by an operator of the X-ray machine, it is preferable to have the X-ray beam automatically adjusted to conform to the size of a particular film cassette. To do so, apparatus must be provided to sense the size of the film cassette. U.S. Pat. No. 3,764,808, issued on Oct. 9, 1973, to R. R. Lackey, et al., disclosed apparatus for this purpose. This device employed a pair of continuously variable transducers, such as rotary potentiometers, mounted on a cassette holder and engageable with a film cassette in order to determine its size. One of the transducers employed a pair of jaws attached to a cable arrangement for centering the film cassette in a first direction, while the other transducer was adjusted by a pivoted arm mounted on the cassette holder and disposed for contacting one side of the film cassette centered between the aforementioned jaws. One problem encountered with this arrangement was that the film cassette might not be centered in the direction perpendicular to the first direction so as to give an erroneous reading to the other of the transducers, resulting in an improper reading of size of the film cassette mounted on the holder.

Another film cassette holder of note is disclosed in applicant's prior filed and copending application Ser. No. 06/318,737, filed Nov. 6, 1981, now U.S. Pat. No. 4,426,724, and entitled "X-Ray Cassette Holder". The film cassette holder disclosed therein acted to center a film cassette in two orthogonal directions using two spring-biased slider-crank mechanisms and acted to measure the size of the film cassette with two linear potentiometers coupled to the slider-crank mechanisms. One disadvantage to this film cassette holder was that to remove the holder and the film cassette from the X-ray machine, the operator needed to pull on the holder with sufficient force to overcome the spring-biased mechanisms. This force was excessive and caused inconvenience in the use of the film cassette holder.

SUMMARY OF THE PRESENT INVENTION

A primary object of the present invention is to provide improved apparatus for positioning an X-ray film cassette within an associated X-ray machine.

Another object of the present invention is to provide an improved X-ray film cassette holder that is operable for centering a film cassette therein during insertion into an associated X-ray machine and for sensing the length and width dimensions of the film cassette.

A further object of the present invention is to provide an improved X-ray cassette holder with reduced insertion and withdrawal forces.

These and other objects, which will hereinafter become apparent, are accomplished in accordance with the illustrated preferred embodiment of the present invention by providing an X-ray film cassette holder that includes a clamping mechanism for positioning a film cassette therein as the holder is inserted into an associated X-ray machine, and two linear potentiometers for sensing the dimensions of the film cassette. The clamping mechanism has two positioning assemblies that act to position the film cassette in two orthogonal directions and an actuator assembly that links the positioning operation to the insertion movement, all mounted on a tray that is adapted for insertion into the X-ray machine.

Each of the two positioning assemblies includes two parallel clamps attached to two slides of a double slider-crack mechanism so that the clamps move in opposite directions as the crack rotates about a pivot in the center of the tray. The positioning assemblies are moveable between a cassette loading position with the clamps spread apart and a cassette clamping position with the clamps surrounding the four sides of the film cassette to position it in the center of the holder. One of the cranks is spring biased toward the clamping position while the other crank is coupled to a locking hub in the actuator mechanism to limit the insertion force of the holder. A wiper is attached to each of the two positioning assemblies for sensing film cassette size according to the resistance of the linear potentiometers.

To operate, the film cassette is placed between the spread apart clamps of the holder, which is then inserted into the X-ray machine. As the holder is inserted, the actuator mechanism couples the enclosing movement of the clamps to the insertion movement of the holder up to the point where the clamps surround the film cassette. At that point, with the film cassette centered between the two sets of parallel clamps, a pawl in the locking hub pivots to lock the positioning assemblies at that orientation and to decouple the positioning assemblies from the actuator mechanism to permit a low insertion force for the remaining portion of the insertion movement. In an alternative embodiment, detents in the actuator mechanism and in one of the cranks serve the same purpose as the pawl and locking hub for coupling and decoupling the positioning assemblies with the actuator mechanism.

One advantage of the X-ray film cassette holder according to the present invention is that it limits the forces associated with holder insertion and withdrawal. Another advantage of the present invention is that it locks the film cassette in the centered position.

These and other objects and advantages of the present invention will no doubt become apparent to those skilled in the art after having read the following detailed description of the preferred embodiments with reference to the several figures of the drawing.

DETAILED DESCRIPTION OF THE PREFERRED EMBODIMENTS

Figure 1:
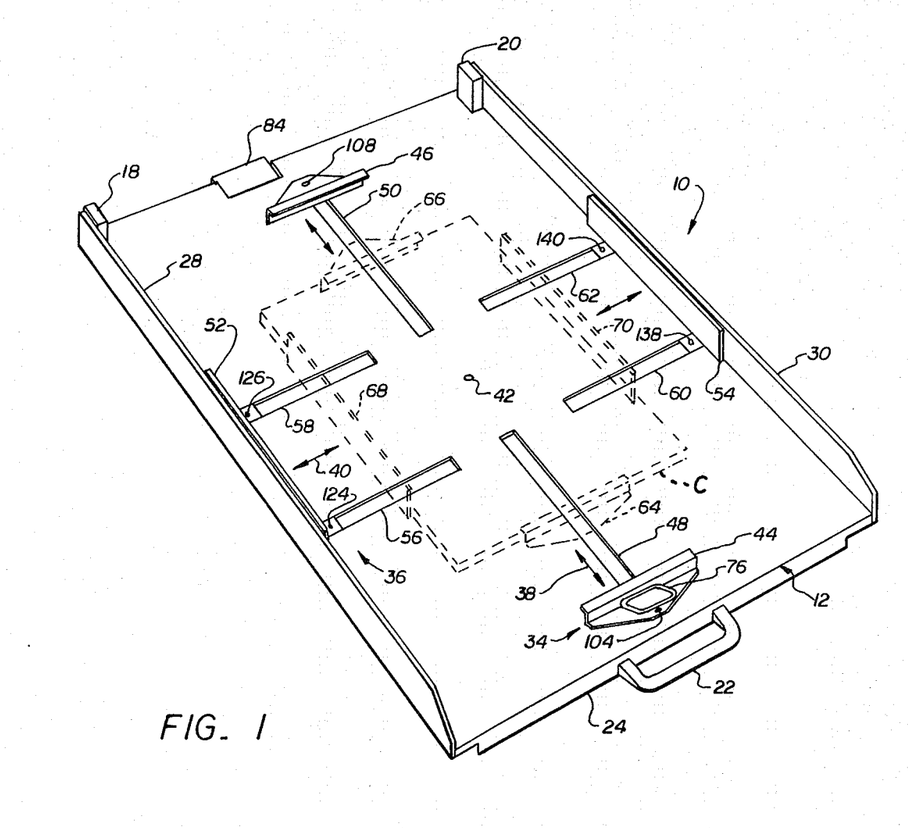
FIG. 1 is an isometric view of the top of an X-ray cassette holder that is constructed in accordance with the present invention. The X-ray cassette holder is shown in a cassette loading position with hold lines as well as in a cassette clamping position with dashed lines.
Figure 2:
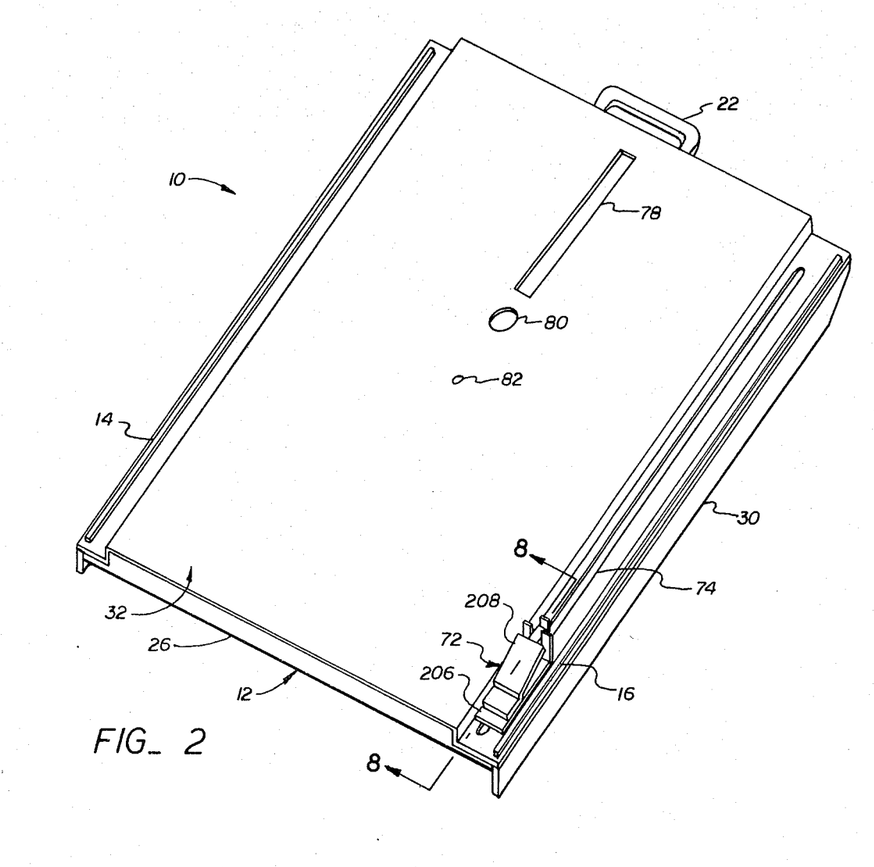
FIG. 2 is an isometric view of the underside of the cassette holder of FIG. 1.

In reference now to FIGS. 1 and 2, there is shown an X-ray film cassette holder 10 according to the present invention for centering a film cassette C within an associated X-ray machine (not shown). A tray 12 includes two skids 14 and 16 and two glides 18 and 20 that are fabricated from a low friction material such as nylon and are affixed to the underside and topside, respectively, of the tray to facilitate insertion into and withdrawal from the X-ray machine. Also, a handle 22 is included for an operator to grasp during holder insertion and withdrawal. A front flange 24 and a rear flange 26 as well as two side flanges 28 and 30 are disposed about the periphery of the generally planar tray 12 for increasing its flexural stiffness. An underside cover 32 is included for covering and protecting linkages located between the cover and the tray 12.

First and second positioning assemblies 34 and 36 are moveable along two orthogonal axes 38 and 40, respectively, and act in unison to position and clamp the film cassette C in the center 42 of the holder 10. Included in the first positioning assembly 34 are front and rear clamping members 44 and 46, respectively, disposed for movement along two longitudinal slots 48 and 50. A linkage positioned between the tray 12 and the cover 32 links the movement of the front and rear clamping members 44 and 46 so that they move either toward or away from the center 42 in unison. In a similar fashion, the second positioning assembly 36 includes left and right clamping members 52 and 54 that are linked together for movement in unison along the axis 40. Two lateral slots 56 and 58 are disposed on the left side of the tray 12 and two additional lateral slots 60 and 62 are disposed on the right side of the tray for coupling the left and right clamping members 52 and 54 to the linkage below.

All four clamping members 44, 46 and 52 and 54 are moveable from a cassette loading position, shown in solid lines in FIG. 1, to a cassette clamping position, shown in dashed lines, where the four clamping members 64, 66, and 68, and 70 surround the film cassette C on four sides to center it in the holder 10. In operation, the operator slides the holder 10 out of the X-ray machine until only the rear portion of the tray 12 remains within the machine (loading position), then places a film cassette C onto the tray between the retracted clamping members 44, 46, 52, and 54 and slides the holder back into the machine (clamping position). To move the first and second positioning assemblies 34 and 36 from the loading position to the clamping position, an actuator mechanism is provided with a actuator slide 72 that attaches to the X-ray machine. The actuator slide 72 is stationary relative to the fixed X-ray machine but moves relative to the holder 10 along a guide slot 74. This relative motion of the actuator slide 72 during holder 10 insertion and withdrawal enables the linkages disposed between the tray 12 and the cover 32 to move the clamping members 44, 46, 52, and 54 between the loading and clamping positions. A wide range of film cassette C sizes may be accommodated by the holder 10 without need for adjustment.

To permit manual retraction of the first positioning assembly 34, a handle 76 is attached to the front clamping member 44. To permit access to the linkages disposed between the tray 12 and the cover 32, two access holes 78 and 80 are provided in the cover. The cover 32 also includes a hole 82 disposed at a position corresponding to the tray center 42 and utilized with a suitable screw fastener for attaching the cover to the holder 10. Also included with the holder 10 is an electrical connector 84 for connecting position sensing apparatus contained within the holder to control circuitry (not shown) of the X-ray machine for the adjustment of the X-ray beam size.

Figure 3:
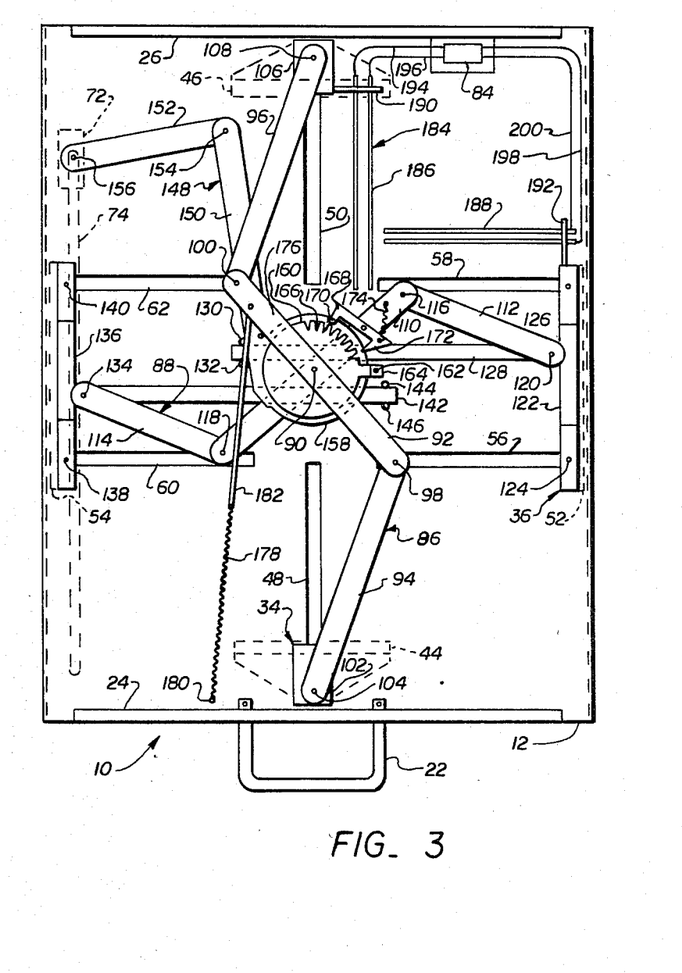
FIG. 3 is a plan view from the underside of a clamping mechanism employed in the cassette holder of FIG. 1 and is shown in the cassette loading position.

Turning now to FIG. 3, the linkages disposed between the tray 12 and the cover 32 will now be described. Basically, the first and second positioning assemblies 34 and 36 each include double slider-crank mechanism 86 and 88, and the actuator mechanism includes an additional slider-crack mechanism, the cranks of which are pivoted about a pivot pin 90 disposed at the center 42 of the holder 10. The viewpoint of FIG. 3 is oriented such that the holder 10 is viewed from the underside with the cover 32 removed.

The first positioning assembly 34 includes a first crank 92 that is pivotably attached to the pivot pin 90 and also includes two equal length links 94 and 96 that are pivotably attached to the first crank by two rivets 98 and 100 at equal distances from the pivot pin. The front link 94 is pivotably attached to a front slider 102 and the front clamping member 44 by a rivet 104. In the rear of the holder 10, the rear link 96 is pivotably attached to a rear slider 106 and the rear clamping member 46 by another rivet 108. When the first crank 92 rotates about the pivot pin 90, the links 94 and 96 move the sliders 102 and 106 in unison either toward or away from the center 42 along the slots 48 and 50. Although rivets have been described herein as the type of fastener that pins this and other linkages together, other comparable fastening means may be used.

In a similar fashion, the second positioning assembly 36 includes a second crank 110 that is pivotably attached to the pivot pin 90 and also includes two equal length links 112 and 114 that are pivotably attached to the second crank by two rivets 116 and 118 at equal distances from the pivot pin. The left link 112 is pivotably attached by a rivet 120 to a left slider 122 which is in turn fastened to the left clamping member 52 by two fasteners 124 and 126. Lateral slots 56 and 58 provide clearance to permit lateral movement of the left slider 122 and the attached left clamping member 52. The left slider 122 includes a fixed left arm 128 that acts in cooperation with two guide pins 130 and 132 to guide the lateral movement of the left slider.

The right side of the second positioning assembly 36 is constructed similarly to the above described left side. The right link 114 is pivotably attached by a rivet 134 to a right slider 136 which is in turn fastened to the right clamping member 54 by two fasteners 138 and 140. Lateral slots 60 and 62 provide clearance to permit lateral movement of the right slider 136 and the attached right clamping member 54. The right slider 136 includes a fixed right arm 142 that acts in cooperation with two additional guide pins 144 and 146 to guide the lateral movement of the right slider.

As with the first positioning assembly 34, the second positioning assembly 36 moves its clamping members 52 and 54 in unison either toward or away from the center 42. As the second crank 110 rotates about the pivot pin 90, the left and right links 112 and 114 move the left and right sliders 122 and 136 and the attached clamping members 52 and 54 in unison. In this way, the first and second positioning assemblies 34 and 36 insure that the film cassette C is centered on the tray 12.

Turning now to the actuator mechanism 148, a third crank 150 is pivotably attached at one end to the pivot pin 90 and at the other to an actuator link 152. The actuator link 152 is pinned to the third crank 150 with a rivet 154 and to the actuator slide 72 with a fastener 156. The end of the third crank 150 that is attached to the pivot pin 90 defines a detent hub 158 that is generally circular in plan view with the center thereof coinciding with the pivot pin. A locking hub 160 that is also circular in plan view and centered at the pivot pin 90 is fixedly attached to the tray 12 by a fastener 162 attached to a tab 164. Disposed about the periphery of the locking hub 160 are several notches 166. A pawl 168 with a roller end 170 and a hook end 172 is pivotably attached to the second crank 110 and is biased in a counterclockwise direction by a first tension spring 174. The pawl 168, the detent hub 158, and the locking hub 160 interact to provide a clutch coupling between the actuator mechanism 148 and the second positioning assembly 36 in a manner that will be later described.

The actuator mechanism 148 also includes a pin 176, affixed to the third crank 150, that acts as a limiting stop to limit the counterclockwise rotation of the first crank 92. The first positioning assembly 34 also includes a second tension spring 178 that is attached to the tray 12 by a fastener 180 and to the first crank 92 by a tie rod 182 and that acts to bias the first crank in a counterclockwise direction. When the holder 10 is moved to the loading position shown in FIG. 3, the pin 176 contacts and rotates the first crank 92 to the position indicated, thereby expanding the second spring 178.

A position measuring device 184 is also shown in FIG. 3 that includes two linear potentiometers 186 and 188, each generally disposed along one of the axes 38 and 40, and two wipers 190 and 192, each attached to a corresponding one of the sliders 106 and 122. The potentiometers 186 and 188 are electrically connected to the electrical connector 84 via wires 194, 196, 198, and 200. In operation, the wipers 190 and 192 short across the windings of their respective potentiometers 186 and 188 according to the positions of the corresponding sliders 106 and 122. When the holder 10 is in the clamping position, the electrical resistances between adjacent wires 194 and 196 and between adjacent wires 198 and 200 are indicative of the positions of the clamping members 46 and 52 and, therefore, also indicative of the size of the film cassette C. The associated X-ray machine is operable for adjusting the size of the X-ray beam according to the film cassette size thus indicated (this operable mechanism is not shown).

Figure 4:
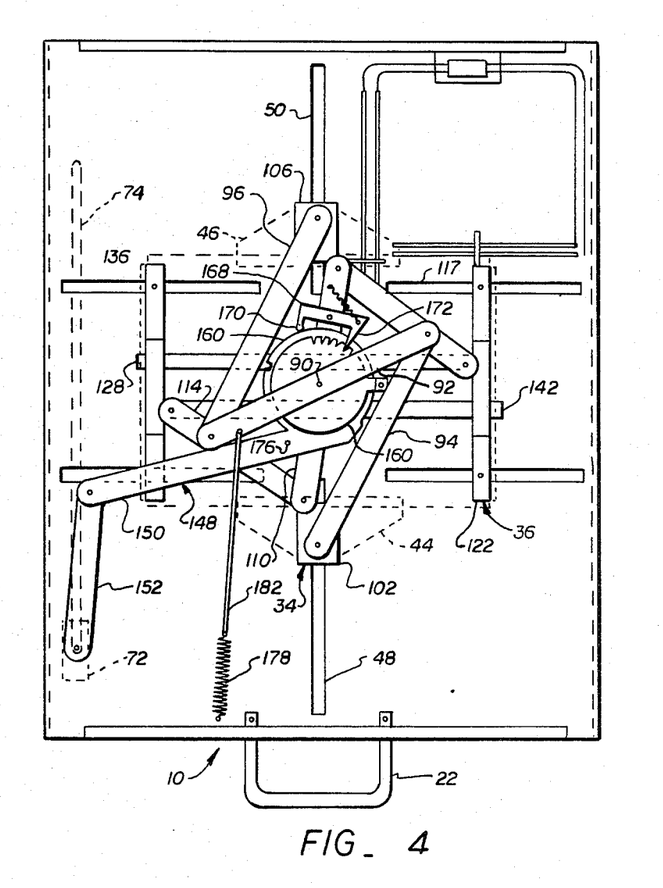
FIG. 4 is a plan view from the underside of a clamping mechanism employed in the cassette holder of FIG. 1 and is shown in the cassette clamping position.

In reference now to FIGS. 4, 5, and 6 in addition to FIG. 3, the coupling between the actuator mechanism 148 and the first and second positioning assemblies 34 and 36 will now be described. The actuator slide 72 moves along the guide slot 74 in the cover 32 relative to the tray 12 as the holder 10 is inserted into the X-ray machine. This movement causes a corresponding counterclockwise rotation of the third crank 150 and the detent hub 158 from the loading position (FIG. 3) to the clamping position (FIG. 4). As the third crank 150 rotates, the pin 176 also rotates allowing the second spring 178 to rotate the first crank 92 counterclockwise thereby moving the front and rear clamping members 44 and 46 in unison toward the film cassette C. The first crank 92 rotates with the third crank 150 until the clamping members 44 and 46 contact and center the film cassette C.

Figures 5, 6:
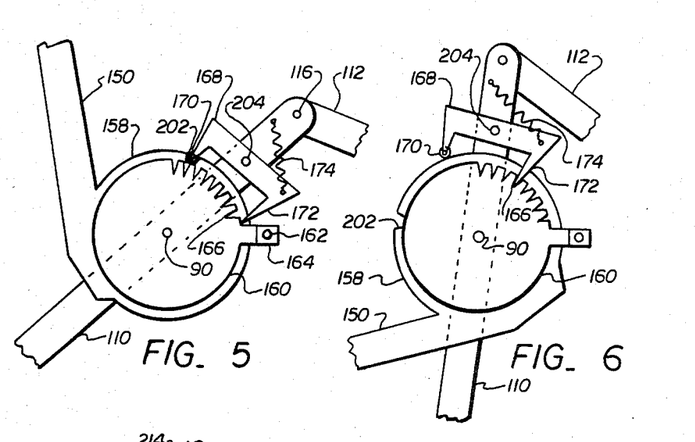
FIG. 5 is a plan view of a locking hub employed in the cassette holder of FIG. 1 and is shown in the cassette loading position.
FIG. 6 is a plan view of the locking hub of FIG. 5 and is shown in the cassette clamping position.

The coupling between the actuator mechanism 148 and the second positioning mechanism 36 in the initial phase of the transition from the loading position to the clamping position is shown in FIG. 5. During this initial phase, the roller 170 of the pawl 168 rides in a detent groove 202 in the detent hub 158. The first spring 174 acts to pivot the pawl 168 about a mounting rivet 204 to insure that the roller 170 stays in the groove 202. With the roller 174 thus positioned in the groove 202, the second crank 110 is coupled to the third crank 150. As the third crank 150 rotates from the loading position, the second crank 110 also rotates counterclockwise thereby drawing the left and right clamping members 52 and 54 into contact with the film cassette C.

When the film cassette C has been centered along the axis 40 by the left and right clamping members 52 and 54, the second crank 110 stops its rotation. At this point, the roller 170 rides out of the groove 202, causing the pawl to pivot and the hook 172 to enter a notch 166 in the stationary locking hub 160. This decouples the detent hub 158 from the second positioning assembly 36, clamping the second positioning assembly 36 in position and allowing the actuator mechanism 148 to complete its movement from the loading to the clamping position. The notches 166 in the locking hub 160 are disposed at positions corresponding to standard film cassette sizes.

Upon withdrawal from the X-ray machine, the third crank 150 rotates clockwise, still decoupled from the second crank 110, up to the point where the roller 170 reenters the groove 202. This action recouples the two cranks 110 and 150, allowing the left and right clamping members 52 and 54 to expand and release the film cassette C. Additionally, the pin 176 mounted on the third crank 150 contacts the first crank 92 and rotates it clockwise to open the front and rear clamping members 44 and 46 to release the film cassette C.

One advantage of this holder 10 is that the force required for insertion into the X-ray machine is greatly reduced because of the decoupling action of the pawl 168. Another advantage is that the force of only one spring need be overcome for withdrawal of the holder 10 from the X-ray machine.

Figure 7:
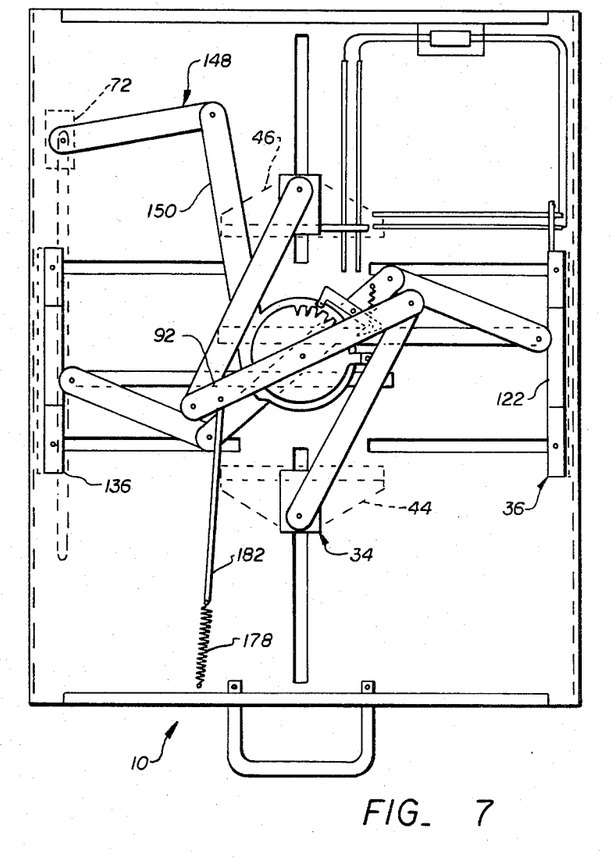
FIG. 7 is a plan view from the underside of an alternative embodiment of a clamping mechanism.

An alternative to the above described coupling between the actuator mechanism 148 and the first positioning assembly 34 is shown in FIG. 7. The motion of the actuator mechanism 148 is completely decoupled from that of the first positioning assembly 34 by removing pin 176. Access to the pin 176 may be gained through the access hole 80 in the cover 12. In this mode of operation, the front clamping member 44 is retracted by an operator using the handle 76, the second spring 178 of the first positioning assembly 34 forces the front and rear clamping members 44 and 46 against the film cassette C, centering it along the first axis 38. Upon insertion into the X-ray machine, the actuator mechanism 148 coupled with the second positioning assembly 36 position the film cassette along the second axis 38 as previously described. An advantage to this mode of operation is that withdrawal of the holder 10 from the X-ray machine requires less force.

Figures 8, 9, 10:
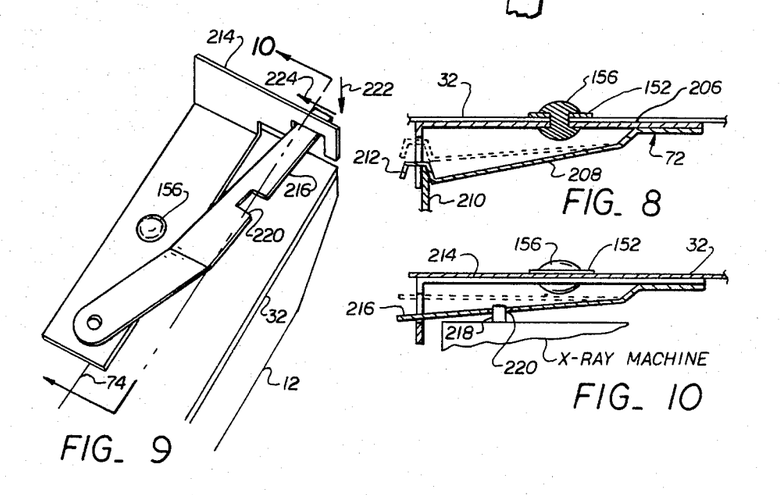
FIG. 8 is a sectional view, taken along the section line indicated in FIG. 2, of a latch mechanism employed in the cassette holder of FIG. 1. This view has been rotated topside up.
FIG. 9 is an isometric view from the underside of the cassette holder of FIG. 1 showing an alternative embodiment of a latch mechanism.
FIG. 10 is a section view of the latch mechanism of FIG. 9 and is taken along the section line indicated in FIG. 9. This view has been rotated topside up.

In reference now to FIGS. 2 and 8, the actuator slide 72 comprises two sheet metal parts: a base 206 and a latch 208. The base 206 is coupled to the actuator link 152 by the fastener 156 which guides the actutor slide 72 in the guide slot 74. When the holder 10 is initially installed in the X-ray machine, the latch 208 deflects, then snaps into place to capture a flange 210 of the machine between it and the base 206. To remove the holder 10 from the X-ray machine, a tab 212 on the front of the latch 208 is lifted to release the flange 210.

In reference now to FIGS. 9 and 10, an alternative embodiment of an actuator slide comprises a base 214 and a latch 216. The base 214 is coupled to the actuator link 152 as above. When the holder 10 is installed, the latch 216 deflects, then snaps into place to capture a pin 218 of the X-ray machine in a groove 220. To remove the holder 10 from the machine, the latch 216 is lifted in direction 222, then rotated in direction 224 to release the pin 218.

Figures 11, 12, 13, 14:
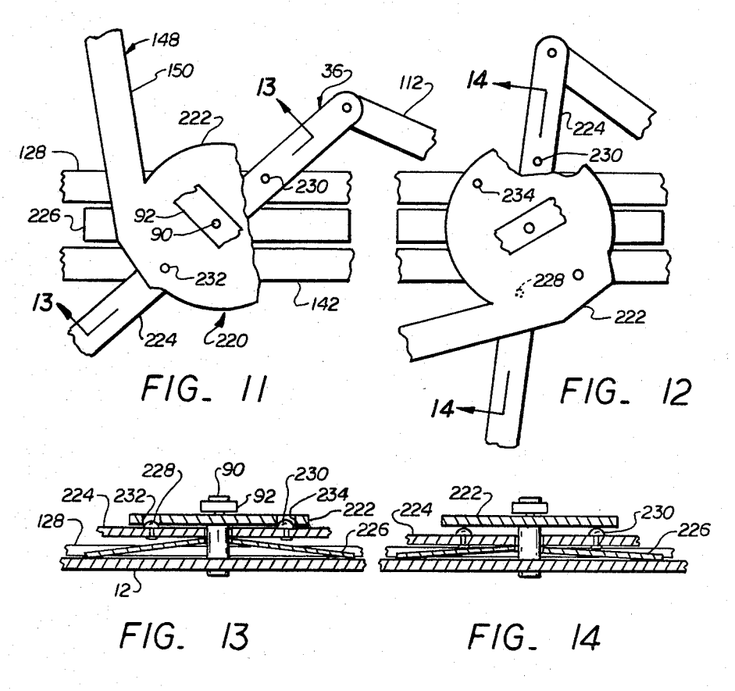
FIG. 11 is a plan view of an alternative hub design employed in the present invention and is shown in the cassette loading position.
FIG. 12 is a plan view of the alternative hub design of FIG. 11 and is shown in the cassette clamping position.
FIG. 13 is a sectional view of the alternative hub design of FIG. 11 taken along the section lines shown in FIG. 11 and is shown in the cassette loading position.
FIG. 14 is a sectional view of the alternative hub design of FIG. 11 taken along the section lines shown in FIG. 12 and is shown in the cassette clamping position. The lower portions of the sections shown in FIGS. 13 and 14 are rotated to more clearly show the function of a leaf spring.

An alternative embodiment of the present invention that includes a different coupling mechanism 230 for releasably coupling the second positioning assembly 36 to the actuator mechanism 148 is shown in FIGS. 11, 12, 13, and 14. In this alternative embodiment, a detent hub 232 formed at the end of the third crank 150 rotatably couples the third crank to the pivot pin 90. The detent hub is disposed under the first crank 92 on the pivot pin. The second positioning assembly 36 includes a second crank 234 that is also rotatably coupled to the pivot pin and functions as the previously described second crank 110. The second crank 234 is positioned on the pivot pin between the detent hub 232 and the fixed left and right arms 128 and 142, respectively, of the second positioning assembly. A leaf spring 236, disposed on the pivot pin under the second crank and between the fixed left arm 128 and the fixed right arm 142, provides a biasing force to push the second crank against the detent hub 232. Two detent rivets 238 and 240 are disposed on the second crank at locations spaced apart from the pivot pin. The heads of the detent rivets fit into corresponding detent holes 242 and 244 in the detent hub 232 when the film cassette holder 10 is in the loading position as shown in FIG. 11.

Coupling mechanism 230 couples the actuator mechanism 148 to the second positioning assembly 36 during the initial phase of the transition from the loading position to the clamping position, but decouples the two during the final phase of the transition. When the film cassette holder 10 is inserted into the X-ray machine, the detent hub 232 of the actuator mechanism and the second crank of the second positioning assembly both rotate counterclockwise until the left and right clamping members 52 and 54 contact the X-ray film cassette C. At that point, the detent rivets 238 and 240 in the second crank ride out of their corresponding detent holes 242 and 244 in the detent hub, thereby forcing the second crank downward and compressing the left spring 236 (see FIG. 14). This decoupling action permits the second crank to stop rotating when the film cassette is centered, while permitting the detent hub to continue to rotate as the holder insertion continues. Friction between the detent rivets and the underside of the detent hub locks the second positioning assembly to keep the cassette centered.

Upon withdrawal of the holder 10 from the X-ray machine, the second crank 234 remains decoupled from the third crank 150 until the detent hub 232 rotates clockwise sufficiently to permit the detent rivets 238 and 240 to reenter their corresponding detent holes 242 and 244. This recouples the second positioning assembly 36 to the actuator mechanism 148, causing the left and right clamping members 52 and 54 to expand and release the film cassette C as the holder is fully withdrawn. As previously described, a pin similar to pin 176 may be installed on the third crank 150 to provide means for releasing the first positioning assembly 34 during withdrawal of the holder.

As will be clear to those skilled in the art, modifications and changes may be made to the disclosed embodiment without departing from the inventive concepts thereof. The above description is intended as illustrative and informative but not limiting in scope. Accordingly, it is intended that the following claims be interpreted to cover all modifications that reasonably fall within the scope of the invention.

What is claimed is:

1. An X-ray cassette holder for inserting and positioning an X-ray film cassette in an X-ray machine, said holder comprising:
   a planar tray including means for inserting and positioning said tray in the X-ray machine and including:
   first positioning means, coupled to said tray, for positioning the X-ray film cassette relative to said tray along a first coordinate axis;
   second positioning means, coupled to said tray, for positioning said cassette relative to said tray along a second coordinate axis orthogonal to said first coordinate axis;
   actuator means, coupled to said machine and said second positioning means, for enabling the positioning of said cassette by said second positioning means as said holder is inserted into said machine including:
- (a) a slide for coupling said actuator means to said machine;
- (b) an actuator link pivotably coupled at one end to said slide; and
- (c) a crank rotatably coupled to the center of said tray and pivotably coupled to the other end of said actuator link; said slide, said actuator link and said crank forming a slider-crank mechanism that rotates said crank as said holder is inserted into and withdrawn from said machine; and releasable coupling means for releasably coupling said actuator means to said second positioning means.

2. A holder as recited in claim 1 wherein said first and second positioning means act to position said cassette in the center of said tray, and wherein said first positioning means includes:

two first clamping members, each slidably coupled to said tray for movement along said first coordinate axis, for clamping said cassette therebetween;

two first links, each pivotably coupled at one end to a respective first clamping member;

a first lever rotatably coupled to the center of said tray at a pivot point centered on said first lever and pivotably coupled at each end thereof to the other ends of the respective first links, said first lever and said first links operable for moving said first clamping members in tandem toward or away from the center of said tray in response to rotation of said first lever; and first biasing means, coupled to said first lever and said tray, for biasing said first clamping members against said cassette;

and wherein said second positioning means includes:

two second clamping members, each slidably coupled to said tray for movement along said second axis, for clamping said cassette therebetween;

two second links, each pivotably coupled at one end to a respective second clamping member; and a second lever rotatably coupled to the center of said tray at a pivot point centered on said second lever and pivotably coupled at each end thereof to the other ends of the respective second links, said second lever and said second links operable for moving said second clamping members in tandem toward or away from the center of said frame in response to the movement of said second lever.

3. A holder as recited in claim 2 wherein said releasable coupling means includes:

a detent hub affixed to said crank and disposed for rotation about the center of said tray, said detent hub including a groove in the outer periphery thereof;

a pawl pivotably coupled to said second lever, said pawl having a roller disposed for contacting the outer periphery of said detent hub; and second biasing means coupled to said second lever for biasing said roller against said detent hub; whereby said roller contacts said groove to couple said actuator means to said second positioning means when said second clamping members are out of contact with said cassette, and whereby said pawl pivots to withdraw said roller from said groove to decouple said actuator means from said second positioning means when said second clamping members are in contact with said cassette.

4. A holder as recited in claim 3 wherein said releasable coupling means additionally includes:

a locking hub, affixed to the center of said tray, hving notches disposed about the periphery thereof; and a hook disposed on said pawl at the end opposite to said roller, said hook operable for entering a selected one of said notches when said pawl pivots to decouple said actuator means from said second positioning means.

5. A holder as recited in claim 2 wherein said releasable coupling means includes:

a detent hub affixed to said crank and disposed for rotation about the center of said tray, said detent hub including first detent means;

second detent means affixed to said second lever for coupling said second lever to said detent hub by mating with said first detent means; and second biasing means for biasing said second lever and said second detent means toward said detent hub and said first detent means.

6. A holder as recited in claim 5 wherein said first detent means is a perforation through said detent hub and said second detent means is a protrusion upon the surface of said second lever and is disposed adjacent said perforation, and wherein mating of said first and second detent means occurs when said protrusion is positioned within said perforation.

* * * * *